United States Patent [19]

Kaneko

[11] Patent Number: 5,125,594
[45] Date of Patent: Jun. 30, 1992

[54] FISHING REEL BODIES OF SUBSTANTIALLY ONE PIECE CONSTRUCTION HAVING T-SHAPED ROD ATTACHING PORTIONS

[75] Inventor: Kyoichi Kaneko, Tokyo, Japan
[73] Assignee: Daiwa Seiko, Inc., Tokyo, Japan
[21] Appl. No.: 709,787
[22] Filed: Jun. 3, 1991

Related U.S. Application Data

[63] Continuation of Ser. No. 532,332, Jun. 5, 1990, abandoned.

[30] Foreign Application Priority Data

Jun. 26, 1989 [JP] Japan .................. 1-74585[U]

[51] Int. Cl.$^5$ .............................. A01K 89/015
[52] U.S. Cl. ............................ 242/316; 43/22
[58] Field of Search ............ 242/316, 310, 323; 43/22

[56] References Cited

U.S. PATENT DOCUMENTS

| 282,270 | 7/1883 | Chubb | 242/316 |
| 1,363,817 | 12/1920 | Schmid | 242/310 |
| 1,421,839 | 7/1922 | Schmid | 242/310 |
| 1,554,132 | 9/1925 | Schmid | 242/316 |
| 2,196,765 | 4/1940 | Fries | 242/316 X |
| 2,482,192 | 9/1949 | MacDonald | 242/316 X |

FOREIGN PATENT DOCUMENTS

| 56-160478 | 4/1981 | Japan . |
| 56-170973 | 5/1981 | Japan . |
| 60-116870 | 5/1985 | Japan . |
| 60-131167 | 6/1985 | Japan . |

Primary Examiner—Daniel P. Stodola
Assistant Examiner—Tony A. Gayoso
Attorney, Agent, or Firm—Longacre & White

[57] ABSTRACT

A fishing reel with a reel body, spool handle, and front and rear attaching portions mounted on the reel body and separated from each other by a distance in the longitudinal direction of the rod. The portions may be integral with or attached to the reel body. Further, the distance between the longitudinal axis of the fishing reel and each of the tops of the attaching portions, is longer in length than the distance between the longitudinal axis of the fishing reel and the periphery of a spool flange.

7 Claims, 3 Drawing Sheets

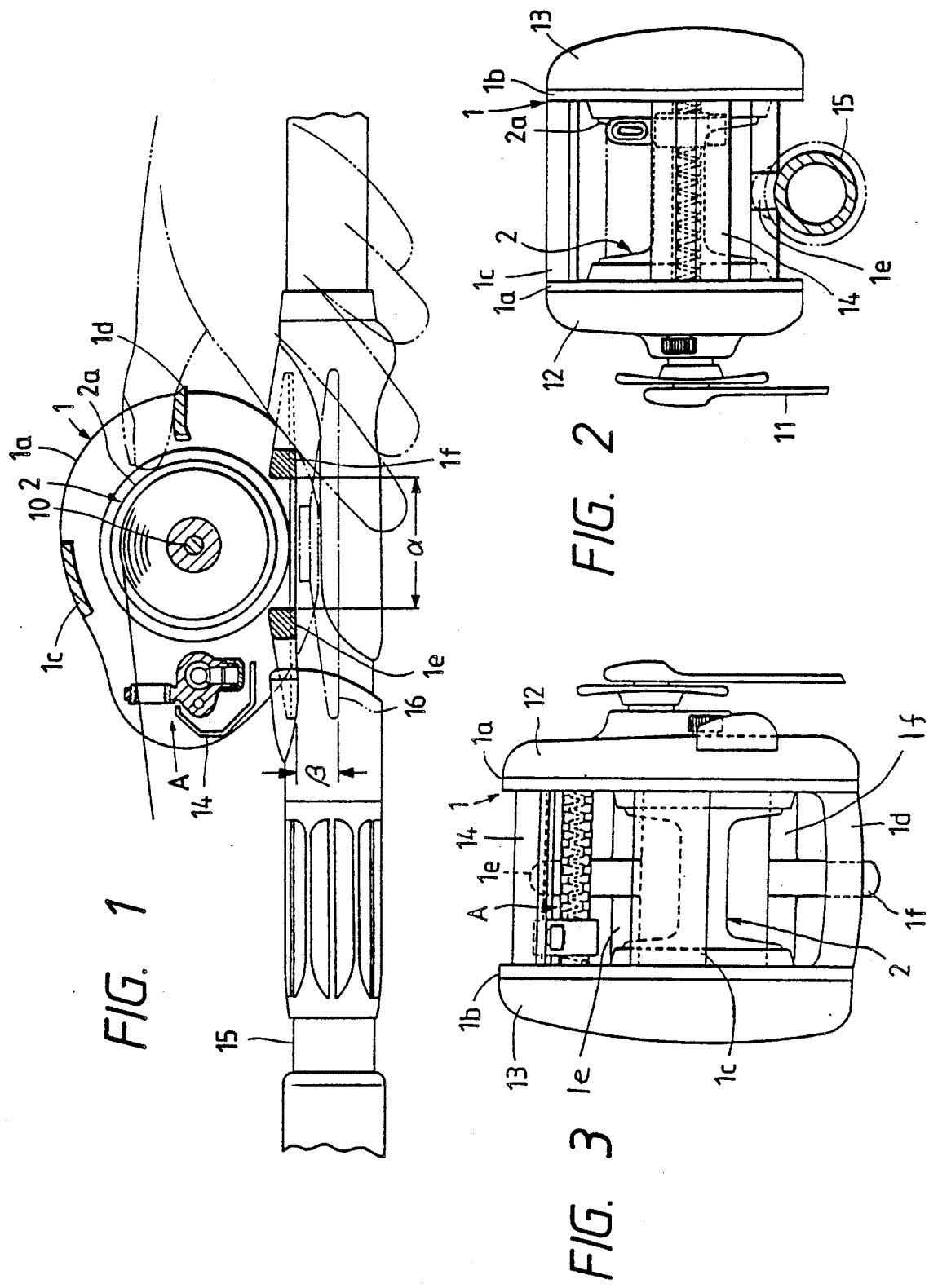

FISHING REEL BODIES OF SUBSTANTIALLY ONE PIECE CONSTRUCTION HAVING T-SHAPED ROD ATTACHING PORTIONS

This is a continuation of U.S. Application Ser. No. 07/532,332, filed Jun. 5, 1990, which was abandoned upon the filing hereof.

BACKGROUND OF THE INVENTION

The present invention relates to a fishing reel whose body is attached to a fishing rod by a reel attaching means.

In a conventional fishing reel including a spool shaft supported at both the ends thereof, a reel attaching means for attaching the body of the reel to a fishing rod is formed integrally with the side plate of the body frame of the reel as described in the Japanese Utility Model Unexamined Publication No. Sho. 60-131167.

In another conventional fishing reel including a spool shaft supported at both the ends thereof, a reel attaching means for attaching the body of the reel to a fishing rod is fixed with a pin or the like to a reel attaching rest frame formed integrally with the side plate of the body frame of the reel, as described in the Japanese Utility Model Unexamined Publication No. Sho. 56-160478.

In yet another conventional fishing reel including a spool shaft supported at both the ends thereof, a reel attaching means for attaching the body of the reel to a fishing rod is secured to a securing bar holding both the side plates of the reel in parallel with each other, as described in the Japanese Utility Model Unexamined Publication No. Sho. 5670973.

In each of these conventional fishing reels, the front and the rear portions of the reel attaching means are formed integrally with the coupling portion thereof, which is located between the front and the rear portions.

In yet another conventional fishing reel including a spool shaft supported at one end thereof, a reel attaching means for attaching the body of the reel to a fishing rod is formed integrally with the frame of the body of the reel or formed separately from the frame and then secured thereto, so that the means is located outside the spool of the reel in the radial direction thereof, as described in the Japanese Utility Model Unexamined Publication No. Sho. 60-116870.

Since the front and rear portions of the reel attaching means of each of the above-mentioned conventional fishing reels whose spool shafts are supported at both the ends thereof are formed integrally with the coupling portion of the means so that the coupling portion is located outside the peripheral edge of the flange of the spool of the reel, the distance between the peripheral surface of the fishing rod and the peripheral edge of the spool must be larger than the sum of the height and thickness of the means and the thickness of the reel attaching rest frame or the securing bar. For that reason, the distance between the axis of the spool of the reel and the peripheral surface of the fishing rod is so large that the holding property of the reel is deteriorated to make it impossible for the fishing person to hold the reel stably.

As a result, the spool thumbing characteristics of the reel when casting are worse thereby making it more difficult for the fisherman to control the rotation of the spool by grasping the rod with his thumb.

Since the distance between the peripheral surface of the fishing rod and the peripheral edge of the flange of the spool of the above-mentioned fishing reel whose spool shaft is supported at one end thereof is larger than the thickness of the reel attaching means, it is hard for the fishing person to control the rotation of the spool by the thumb of his hand grasping the fishing rod, at the time of the casting of the fishline from the reel and the rod, the thumbing of the reel or the like. This is the same problem.

SUMMARY OF THE INVENTION

The present invention was made in order to solve the above-mentioned problem.

Portions of the side frame $1a$ have horizontally extending grooves $1g$ and $1h$ and also through holes $1i$ and $1j$ the reel from the reel attaching means thereof and that of the spool of the reel from the means are decreased to improve the holding property of the reel to make it possible to hold the reel stably. For that reason, the spool thumbing property of the reel is improved to facilitate control of the rotation of the spool of the reel, the reel is made compact, and the center of gravity of the reel is located lower to make it easier to cast the fishline from the reel and the fishing rod to which the reel is attached by the reel attaching means.

The spool is supported by the body of the fishing reel so that the spool can be rotated by turning the handle of the reel. The body of the reel is attached to the fishing rod by the reel attaching means. The reel is characterized in that the reel attaching means is made of a front and a rear reel attaching portions provided on the body of the reel and separated from each other by a distance in the longitudinal direction of the fishing rod. As a result, the fishing reel is located as a whole nearer the fishing rod so that the holding property of the reel is improved to make it possible for the fishing person to hold the reel stably, and the thumb of his hand grasping the fishing rod can be easily put on the peripheral edge or outside surface of the spool of the reel and the fishline wound thereon. The thumbing property of the reel is thus improved to facilitate control of the rotation of the spool. Since the reel is located as a whole nearer the fishing rod, the rightward and leftward swaying of the reel at the time of winding the fishline on the spool is reduced to enhance the stability of the reel. Since the center of gravity of the reel is located nearer the axis of the fishing rod, it is easier to cast the fishline from the reel and the rod. Since the height of the reel is diminished as a whole, the reel is made compact.

DESCRIPTION OF THE DRAWINGS

FIG. 1 is a cross-sectional view of a fishing reel which is an embodiment of the present invention and includes a spool shaft supported at both the ends thereof;

FIG. 2 is a front view of the fishing reel;

FIG. 3 is a plan view of the fishing reel;

DETAILED DESCRIPTION OF EXEMPLARY EMBODIMENTS

Figure 4:
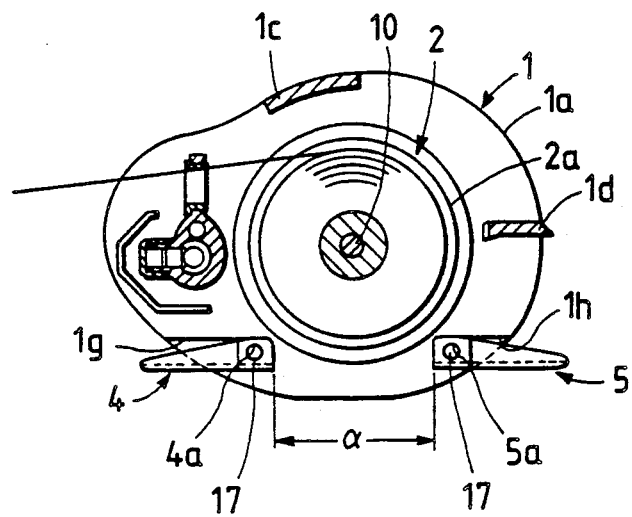
FIG. 4 is a cross-sectional view of a fishing reel which is another embodiment of the present invention and includes a spool shaft supported at both the ends thereof.

Embodiments of the present invention are hereafter described in detail with reference to the drawings attached hereto.

FIGS. 1, 2 and 3 show a fishing reel which is one of the embodiments and includes a spool shaft 10 supported at both the ends thereof. The front reel attaching portion 1e and rear reel attaching portion 1f of the fishing reel are formed integrally with the body 1 of the reel. The reel body includes both side frames 1a and 1b integrally coupled to each other by a support plate 1c and a finger rest 1d which are formed integrally with the side frames. The spool 2 of the reel is secured to the spool shaft 10 between the side frames 1a and 1b so that the spool can be rotated by turning the handle 11 of the reel. The side plates 12 and 13 of the reel are secured to the outsides of the side frames 1a and 1b. The fishline guide A of the reel is provided on the front portions of the side frames 1a and 1b so that the guide is reciprocated rightward and leftward in conjunction with the rotation of the spool 2. The protective member 14 of the reel is secured between the side frames 1a and 1b in front of the fishline guide A so as to prevent the finger or thumb of the fishing person from being pinched by the reel between the side frames.

As shown in FIG. 1, the front and the rear reel attaching portions 1e and 1f, which constitute the reel attaching means of the fishing reel, are formed integrally with the front and rear portions of the side frames 1a and 1b, outside the flange 2a of the spool 2 in the radial direction thereof, so that the front and the rear reel attaching portions are separated from each other by a distance $\alpha$ in the longitudinal direction of a fishing rod 15, to which the fishing reel is attached by the reel attaching means.

As shown in FIG. 3, each of the front and the rear reel attaching portions 1e and 1f is shaped as T. The front and the rear reel attaching portions 1e and 1f are provided on the side frames 1a and 1b so that the tops of the attaching portions are located higher than the bottom of the flange 2a of the spool 2 when the fishing reel is attached to the fishing rod 15 by the reel attaching means. For that reason, the reel attaching portions 1e and 1f can be located higher by a height difference $\beta$ such as 5 mm than the reel attaching means 16 of a conventional fishing reel, which is shown by a two-dot chain line in FIG. 1.

Further, the height from the reel attaching portions 1e and 1f to the top of the spool 2 and that from the portions to the top of the body 1 are smaller than those of the conventional fishing reel so that the hand holding property of the fishing reel provided in accordance with the present invention is improved to enable the fishing person to hold the reel stably. For that reason, the thumb of his hand grasping the fishing rod 15 can be easily put on the peripheral portion of the flange 2a of the spool 2 or on the fishline wound thereon. The thumbing property of the fishing reel is thus improved to facilitate the control of the rotation of the spool 2. Furthermore, the total height of the fishing reel is decreased so that it is made compact. Since the height of the reel attached to the fishing rod 15 by the reel attaching means is decreased so that the rotary shaft for the handle 11 is located nearer the fishing rod, the rightward and leftward swaying of the reel at the time of winding the fishline on the spool 2 is reduced to enhance the stability of the reel. Since the center of gravity of the reel is thus located nearer the axis of the fishing rod 15, it is easier to cast the fishline from the reel and the rod.

Figure 5:
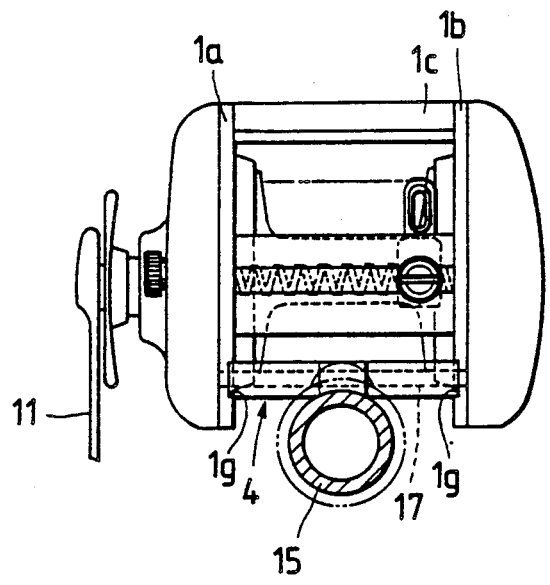
FIG. 5 is a front view of the fishing reel shown in FIG. 4.
Figure 6:
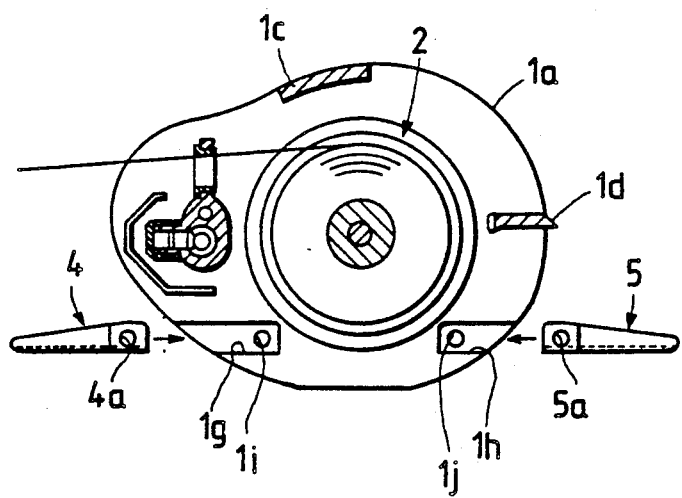
FIG. 6 is a cross-sectional view of the fishing reel shown in FIG. 4 and shows the state that the front and rear reel attaching portions of the reel attaching means of the reel are removed from the body of the reel.

FIGS. 4, 5 and 6 show a fishing reel which is another of the embodiments and includes a spool shaft 10 supported at both the ends thereof. The front reel attaching portion 4 and rear reel attaching portion 5 of the fishing reel are fitted in the grooves 1g and 1h of the body 1 of the reel and secured thereto by screws 17 so that the attaching portions constitute the reel attaching means of the reel. The reel body 1 includes both side frames 1a and 1b integrally coupled to each other by a support plate 1c and a finger rest 1d which are integrally formed with the side frames. The spool 2 of the fishing reel is secured to the spool shaft 10 between the side frames 1a and 1b so that the spool can be rotated by turning the handle 11 of the reel. As shown in FIGS. 4 and 6, the front and rear portions of the side frame 1a have the grooves 1g and 1h slenderly extending horizontally, and through holes 1i and 1j. The grooves 1g and 1h and the through holes 1i and 1j are located outside the flange 2a of the spool 2 in the radial direction thereof, and the grooves are separated from each other by a distance $\alpha$. The side frame 1b also has the grooves 1g and 1h and through holes 1i and 1j in the same manner as the side frame 1a. It is preferable that the through holes 1i and 1j of the side frame 1b are tapped holes. The front reel attaching portion 4 is fitted in the grooves of the side frames 1a and 1b and secured thereto by the screw 17 inserted into the through hole 4a of the front reel attaching portion and the through hole 1i of the side frame 1a and engaged in the tapped through hole 1i of the other side frame 1b. The rear reel attaching portion 5 is fitted in the grooves 1h of the side frames 1a and 1b and secured thereto by the other screw 17 inserted into the through hole 5a of the rear reel attaching portion and the through hole 1j of the side frame 1a and engaged in the tapped through hole 1j of the other side frame 1b. As a result, the front and the rear reel attaching portions 4 and 5 are separated from each other by the distance $\alpha$ in the longitudinal direction of a fishing rod 15 in the same manner as the fishing reel shown in FIGS. 1, 2 and 3. The fishing reel shown in FIGS. 4, 5 and 6 is attached to the fishing rod 15 by the reel attaching means. If the front and the rear reel attaching portions 4 and 5 are equalized to each other in form, they can be used interchangeably with each other. Although the front and the rear reel attaching portions 4 and 5 are fitted in the grooves 1g and 1h of the side frames 1a and 1b in this embodiment, the present invention may be otherwise embodied so that the attaching portions are fitted in U-shaped projections provided on the side frames instead of the grooves.

Although the body of each of the fishing reels shown in FIGS. 1, 2, 3, 4, 5 and 6 includes the side frames 1a and 1b integrally coupled to each other by the support plate 1c and the finger rest 1d which are formed integrally with the side frames, the present invention may be otherwise embodied so that the side frames are manufactured separately from each other instead of being manufactured integrally with each other as in the above-described embodiments and are then coupled to each other by a support plate and a finger rest which are manufactured separately from each other and from the side frames. Although the side plate 13 is manufactured separately from the side frame 1b located opposite the handle 11 and is then secured to the side frame in each of the above-described embodiments, the present invention may be otherwise embodied so that the side plate is manufactured integrally with the side frame.

Figure 7:
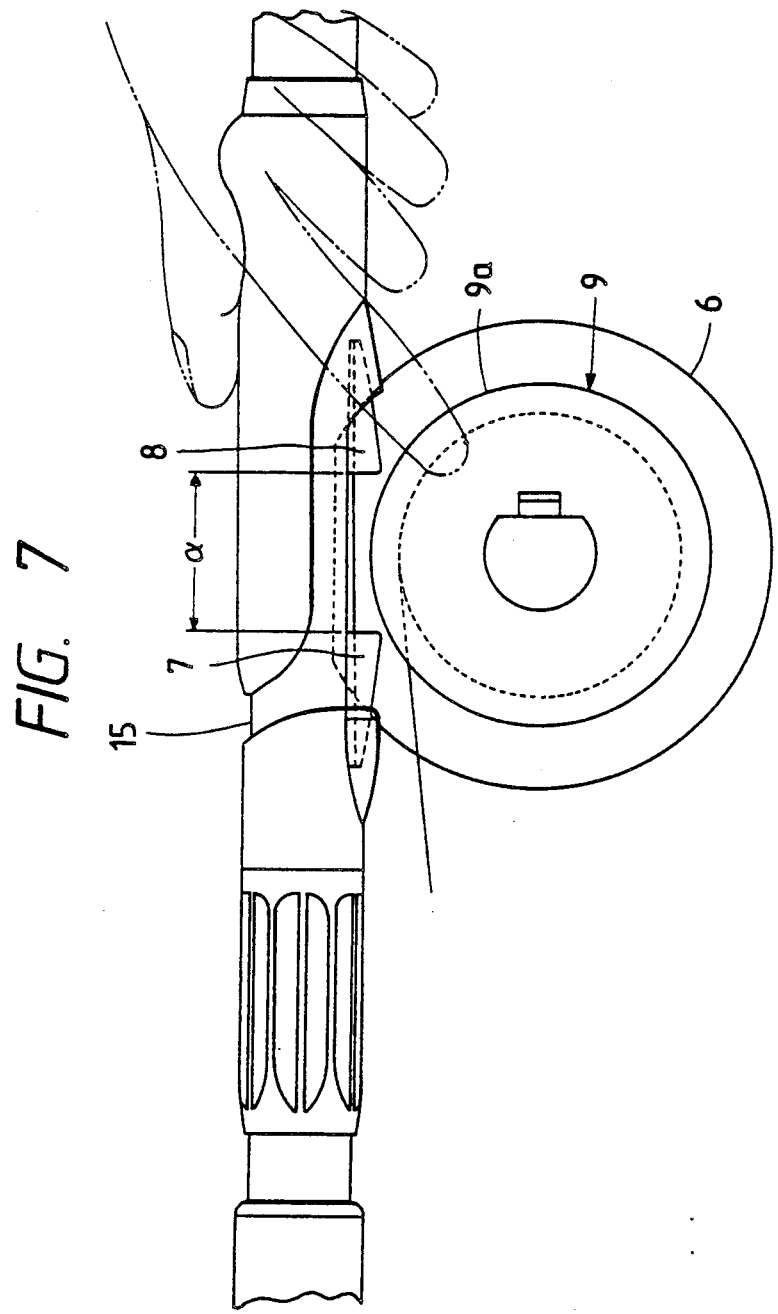
FIG. 7 is a side view of a fishing reel which is yet another embodiment of the present invention and includes a spool shaft supported at one end thereof.

FIG. 7 shows a fishing reel which is yet another of the embodiments and includes a spool shaft supported at one end thereof. The front reel attaching portion 7 and rear reel attaching portion 8 of the fishing reel are formed integrally with the body 6 of the reel or are manufactured separately from the reel body and then secured thereto, so that the front and the rear reel attaching portions constitute a reel attaching means and are separated from each other by distance $\alpha$ in the longitudinal direction of a fishing rod 15, to which the reel is attached by the means. When the reel is attached to the fishing rod 15 thereunder by the reel attaching means, the bottoms of the front and the rear reel attaching portions 7 and 8 are located lower than the top of the flange 9a of the spool 9 of the reel so that the thumb of the fishing person's hand grasping the fishing rod can be easily put on the peripheral portion of the flange of the spool. For that reason, the thumbing property of the reel is improved to facilitate the control of the rotation of the spool 9. Since the reel is located as a whole nearer the fishing rod 15, the rightward and leftward swaying of the reel at the time of winding the fishline on the spool 9 is reduced to enhance the stability of the reel. Since the center of gravity of the reel is located nearer the axis of the fishing rod 15, it is easier to cast the fishline from the reel and the rod.

What is claimed is:

1. A fishing reel comprising:
   a one-piece reel body having left and right side frames with an integral lateral support for traversely connecting said side frames and with integral front and rear attaching portions for attaching said reel to a rod having means for engagement;
   a spool mounted for rotation on said body;
   a handle for rotating said spool;
   each of said attaching portions being T-shaped and having top and bottom edges for engagement with said engagement means provided on said rod;
   said attaching portions being separated from each other by a distance in the longitudinal direction of said rod, and wherein said spool has a flange, and said attaching portions being located so that when the reel is to be mounted onto the rod having a longitudinal axis, the distance between said longitudinal axis and each of the top edges of said attaching portions when engaged in said engaging means is longer in length than the distance between said longitudinal axis and the periphery of said spool flange.

2. A reel as in claim 1 wherein said reel attaching portions are integral with said body.

3. A reel as in claim 1 wherein said portions are attached to said body.

4. A reel as in claim 1 wherein said portions are T-shaped.

5. A reel as in claim 1 wherein said body includes side frames and a support plate integrally connected said side frames, and wherein said portions extend from said side frames.

6. A reel as in claim 1 wherein said body includes grooves for securing said portions to said body.

7. A fishing reel comprising:
   a reel body including engagement grooves;
   a spool mounted for rotation on said body;
   a handle for rotating said spool; and
   T-shaped front and rear reel attaching portions provided on said body for attaching the reel to a rod, said portions having top and bottom edges for engagement with said grooves provided on said body and said portions being two identical separate members and separated on said reel from each other by a distance in the longitudinal direction of the rod, wherein said spool has a flange, and wherein said portions are located so that when the reel is to be mounted onto the rod having a longitudinal axis, the distance between said longitudinal axis and each of the top edges of said portions when engaged in said grooves is longer in length than the distance between said longitudinal axis and the periphery of said spool flange.

* * * * *